Sept. 11, 1956 H. K. FOSTER 2,762,885
CONTROL MEANS FOR ELECTRIC APPARATUS
Filed March 5, 1953

INVENTOR.
HOYT K. FOSTER
BY
Morgan Finnegan + Durham
ATTORNEYS.

United States Patent Office 2,762,885
Patented Sept. 11, 1956

2,762,885

CONTROL MEANS FOR ELECTRIC APPARATUS

Hoyt K. Foster, Hollis, N. Y., assignor to S. W. Farber, Inc., New York, N. Y., a corporation of New York Application March 5, 1953, Serial No. 340,568

7 Claims. (Cl. 200—122)

The present invention relates to control mechanism for electrical apparatus and has specific reference to an on-off type of control particularly adapted to regulate the output of an electric heater or the like.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
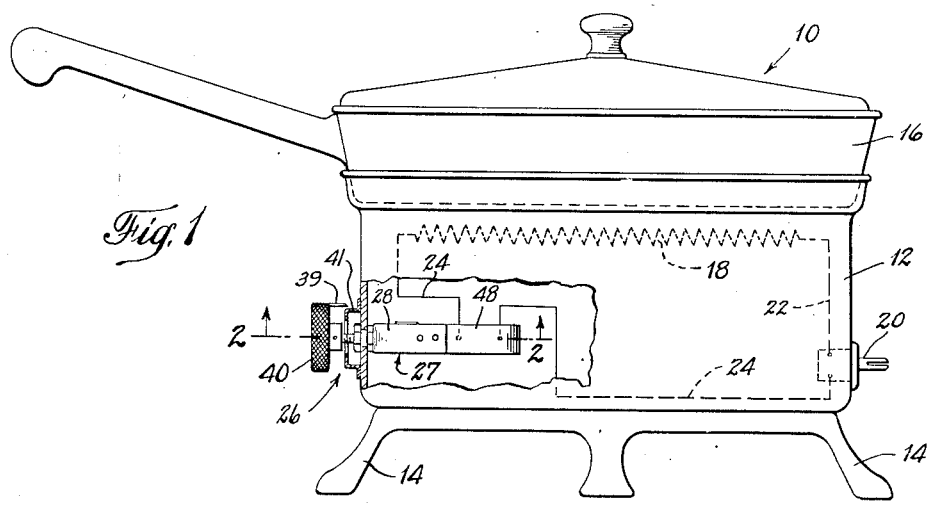
Figure 1 is an elevational view of a chafing dish having a preferred embodiment of the control mechanism of the present invention incorporated therein and having a portion of the base broken away to show the disposition of the control therewithin.

The present invention has for its object the provision of an improved adjustable electrical control device of the on-off type especially adapted to maintain an electric heater or similar device at a predetermined percentage of its rated capacity in accordance with the manual adjustment of the control device. A further object is the provision of an improved electrical control device which is extremely simple in construction lending itself to inexpensive manufacturing processes and which is reliable and accurate in its operation.

In accordance with the illustrative and preferred embodiment of the invention, the improved control device is shown as mounted in a housing of a chafing dish and connected in series with a resistance type electric heater positioned beneath the food container which is supported on the upper rim of this housing. The control device preferably comprises an electric switch the contacts of which during operation of the heater continuously open and close making and breaking the heater circuit. Preferably, the contacts are mounted on arms that are connected to but electrically insulated from opposite legs of a U-shaped frame member which normally maintains the contacts in engagement. The force with which the contacts are urged into engagement is adjusted by adjusting the spacing of these legs by means of an adjustable wedge member positioned between opposed surfaces of inwardly projecting ears formed on the legs. A bimetal element is operative upon an increase in its temperature to move one of the contacts away from the other to break the heater circuit and actuation of this bimetal element is had by an electric heater coil wound around the element and connected in series with the contacts so that energization and de-energization of the heater coil is controlled by closing and opening of the contacts. A second bimetal element is preferably employed to compensate for the effect that ambient temperature changes have upon relative movement of the contacts by the first mentioned bimetal element rendering the control device insensitive to ambient temperature changes.

It will be understood that the foregoing general description and the following detailed description as well are exemplary and explanatory of the invention but are not restrictive thereof.

Referring now to the drawings, wherein like reference characters are used throughout to designate like elements, the illustrative and preferred embodiment of the novel control means of the present invention is shown as incorporated in a chafing dish generally designated 10 and comprising a housing member 12 that is supported on suitable legs 14 and which supports within its upper rim food container 16. The contents of container 16 is maintained warm by means of electric heater element 18 retained within housing 12 by any suitable means (not shown) and electrically connected to plug 20 through leads 22 and 24 and through which connection is had with a suitable potential.

The output of heater element 18 is regulated by the novel control device 26 which is connected in series with lead 24 and is mounted on the wall of housing 12. As embodied control device 26 comprises a generally U-shaped metallic support or frame member 27 having legs 28 and 30 and base 32. Secured within a suitable opening in base 32 is shouldered bushing 34 which is fastened to the wall of housing 12 by nut 35 threadedly received upon its shank. Bushing 34 is provided with a threaded axial bore 36 within which is received threaded stem or rod 38. Rod 38 has secured to its outer end actuating knob 40 and to its inner end frusto conical member 42 which is positioned intermediate complementary surfaces 44 and 46 formed on ears 47 and 49 extending inwardly from legs 28 and 30, respectively. Through this arrangement the spacing between legs 28 and 30 can, within limits, be adjusted, outward movement of the arms being had by threading rod 38 into bore 36 thereby advancing member 42 between surfaces 44 and 46 inward movement being had by threading rod 38 out of bore 36 thereby retracting member 42 from between the surfaces.

Control knob 40 has extending from its periphery a suitable pointer 39 that cooperates with indicia provided on member 41 and representing percentages of rated output of heater 18, although it is to be understood that other indicia indicating various degrees of heat may be employed.

Connected to the ends of legs 28 and 30, respectively, and forming extensions thereof are metallic arms 48 and 50 which are formed with reverse bends at their extremities and have electrical contacts 52 and 54, respectively, secured to their outer ends. Also connected to the end of leg 30 is bimetal element 56 which, in response to an increase in its temperature, bends downward as viewed in Figure 2 urging arm 50 away from arm 48 thereby opening contacts 52 and 54.

Actuation of bimetal element 56 is effected by means of electric heater coil 58 wound around the element and embedded in electrical insulation 60 to electrically insulate the coil from element 56. One end of coil 58 is connected to an end of lead 24 and the other end is connected to metallic arm 50 which is connected to another end of the lead through contacts 54 and 52 and arm 48 thereby establishing a series connection of control device 26 with lead 24.

Figure 2:
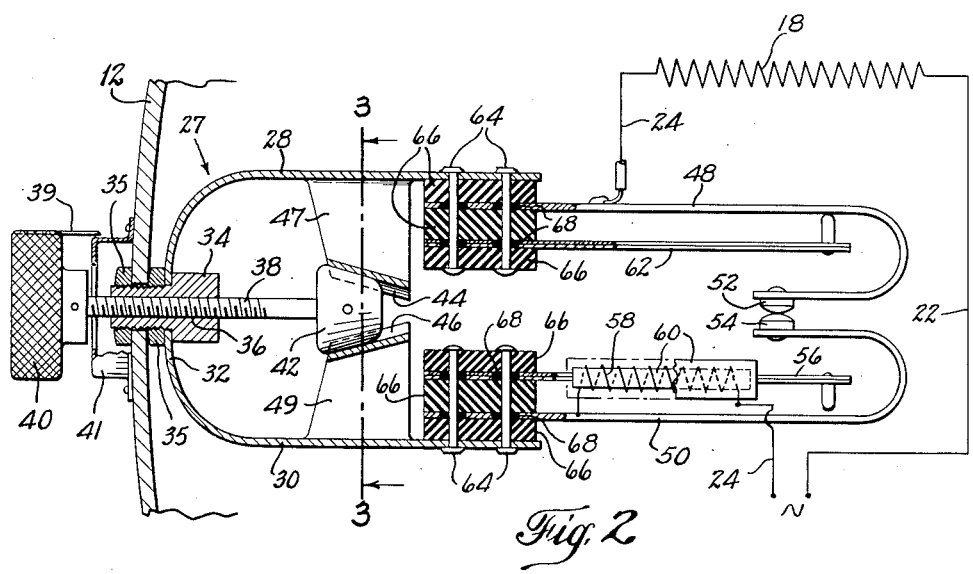
Figure 2 is a sectional view of the control mechanism taken along line 2—2 of Figure 1.
Figure 3:
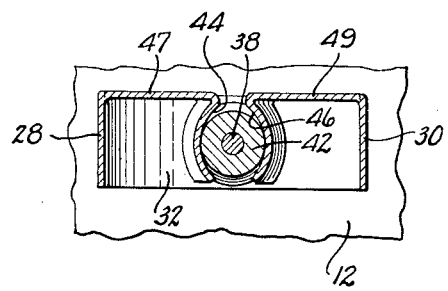
Figure 3 is a transverse sectional view taken along line 3—3 of Figure 2.

In order to compensate for the effect produced by movements of bimetal element 56 in response to ambient temperature changes bimetal element 62 is secured to the end of leg 28 and is arranged to normally exert a predetermined force against arm 48 in an upward direction as viewed in Figure 2 tending to urge contact 52 away from contact 54. As the ambient temperature increases, element 62 bends downward decreasing its applied force that tends to open the contacts by an amount equal to the increased force developed by bimetal element 56 in response to the same increase in ambient temperature and tending to open the contacts.

The connection of the arms 48 and 50 and the bimetal elements 62 and 56 with their respective legs of support member 27 is preferably had by means of rivets 64 which extend through openings provided in these members. In order to prevent short circuiting of the control device through these connections, adjacent elements are electrically insulated from each other by insulating strips 66 and insulating washers 68 surrounding the rivets where they pass through the elements.

In operation, knob 40 is first adjusted so that pointer 39 is opposite the desired rating of heater 18 and then plug 20 is connected to a suitable source of potential energizing electric heater 18 and its associated circuit. In energizing heater 18 current flows through lead 24 to the control device 26 where it flows through heating coil 58, arm 50, contacts 52 and 54, and arm 48, and then continues through the remainder of lead 24 to heater 18. Thus with the energization of heater 18 heating coil 58 is also energized causing the temperature of bimetal element 56 to rise which in turn causes element 56 to move in a direction to open contacts 52 and 54. Opening of these contacts de-energizes the entire electric circuit including heater 18 and heating coil 58. With coil 58 de-energized bimetal element 56 cools and moves in a direction to close contacts 52 and 54. This cycle of operation is continuously repeated with the frequency and length of time contacts 52 and 54 are closed determining the percentage of rated output at which the heater 18 operates. This percentage may be adjusted by rotating knob 40 thereby advancing or retracting member 42 from between surfaces 44 and 46 to vary the spacing of legs 28 and 30. The further legs 28 and 30 are spaced apart the greater will be the time interval during which contacts 52 and 54 are open and the shorter will be the time the contacts are closed, which results in reducing the output of heater 18.

Since bimetal element 62 has the reverse effect upon relative movement of contacts 52 and 54 with regard to element 56 the control device is not affected by changes in ambient temperature.

The invention in its broader aspects is not limited to the specific mechanisms shown and described but departures may be made therefrom within the scope of the accompanying claims without departing from the principles of the invention and without sacrificing its chief advantages.

What is claimed is:

1. In an electrical device of the type described a control mechanism comprising a frame member having a pair of spaced support members, a pair of electrical contacts normally being urged into engagement by said support members, a bimetal element secured to one of said support members and operable to move one of said contacts away from the other contact in response to an increase in the temperature of said element, an electrical heating means disposed immediately adjacent said bimetal element, said heating means being connected in series with said contacts, and means to adjust the spacing of the support members including ears formed on said support members and projecting toward one another with their inner extremities presenting opposed faces and wedge means adjustably disposed between said opposed faces to adjust the spacing therebetween and accordingly the spacing between the support members.

2. A control device as claimed in claim 1 including a second bimetal element operative to compensate for the effect that ambient temperature changes have upon the relative movement of the contacts by the first mentioned bimetal element.

3. An electrical control device comprising a generally U-shaped frame having resilient legs, a pair of electrical contacts one of which is effectively connected to each of said legs, said contacts normally being urged into engagement by said legs, a bimetal element connected to a leg of the frame and operative upon an increase in the temperature of the element to urge one of said contacts away from the other contact, an electrical heating means disposed over said bimetal element and connected in series with said contacts, and ears projecting inwardly from each of said legs, said ears presenting at their extremities opposed surfaces, and adjustable means disposed between and in engagement with said opposed surfaces and operative to adjust the spacing between said opposed surfaces and accordingly the spacing between the legs.

4. An electrical control device as claimed in claim 3 wherein the means for adjusting the spacing between the opposed surfaces comprises a shaft frictionally received within a portion of the base of the U-shaped frame member and a wedge member disposed on the end of the shaft intermediate the opposed surfaces.

5. An electrical control device as claimed in claim 4 wherein the frictional connection between the shaft and the base member comprises cooperating screw threads.

6. In an electrical device of the type described a U-shaped frame, a metallic arm secured to each of the legs of the frame forming extensions of said legs, an electrical contact secured to each of said arms and normally urged into engagement by the legs of said frame, a bimetal strip secured at one end to one of said legs and operable to have its other end engage the arm connected to said one leg to move the contact connected thereto away from the other contact in response to an increase in the temperature of the strip, an electrical heater positioned immediately adjacent said strip and electrically connected at one end to the adjacent arm, inwardly projecting ears formed on the legs of said frame and presenting at their extremities opposed faces corresponding to a portion of the surface of a cone lying on an axis of the frame paralleling the legs thereof, a member having a conical surface nesting within said opposed faces, stem means generally coaxial with the aforementioned axis of the frame, said stem being threadedly received within a portion of the base of said frame and connected with said member to adjust said member along said axis and accordingly adjust the spacing of the legs of the frame.

7. Apparatus as claimed in claim 6 including a second bimetal strip secured at one end to the other leg of the frame with its other end exerting a force against the arm connected to said other leg tending to move the contact connected thereto away from the other contact, said second bimetal strip being operative to decrease this force in response to an increase in the temperature of the strip to thereby compensate for the effect produced by movement of the first mentioned bimetal strip in response to variations in ambient temperature.

References Cited in the file of this patent

UNITED STATES PATENTS

| | | |
|---|---|---|
| 1,772,002 | Harper | Aug. 5, 1930 |
| 2,103,560 | Smith et al. | Dec. 28, 1937 |
| 2,248,531 | Harris | July 8, 1941 |
| 2,399,423 | Bletz | Apr. 30, 1946 |
| 2,493,294 | Kronmiller | Jan. 3, 1950 |
| 2,632,085 | Brosseau | Mar. 17, 1953 |